(12) United States Patent
Tanigawa et al.

(10) Patent No.: US 6,307,951 B1
(45) Date of Patent: *Oct. 23, 2001

(54) MOVING BODY DETECTION METHOD AND APPARATUS AND MOVING BODY COUNTING APPARATUS

(75) Inventors: Hiroshi Tanigawa; Satoru Shibuya, both of Kyoto (JP)

(73) Assignee: Giken Trastem Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,985

(22) Filed: Sep. 25, 1997

(51) Int. Cl.[7] ....................................................... G06K 9/00
(52) U.S. Cl. ............................................ 382/103; 382/280
(58) Field of Search ..................................... 382/103, 236, 382/280; 348/169, 152, 153, 154, 155; 708/403; 340/907, 541

(56) References Cited

U.S. PATENT DOCUMENTS 3,700,801 * 10/1972 Dougherty ............................ 348/169
4,297,725 * 10/1981 Shimizu et al. ...................... 348/169
5,341,435 * 8/1994 Corbett et al. ....................... 348/169

OTHER PUBLICATIONS

Gazo Sher, Oyo Gijutsu, "Applied Technology of Image Processing", Hiroshi Tanaka, Published by Kogyo Chonsatcai K.K., 1995.*

* cited by examiner

Primary Examiner—Samir Ahmed
(74) Attorney, Agent, or Firm—Koda & Androlia

(57) ABSTRACT

A moving body detection method and apparatus which detects moving bodies by processing image data for said moving bodies, including a process in which spatial phases, which are obtained by the operational formula $\tan^{-1}$ (AS/AC) or $\cot^{-1}$ (AC/AS) (where AC is a Fourier cosine transformation and AS is a Fourier sine transformation) in a case where image signals obtained as aggregates of picture elements on the basis of picture element data constituting the image data are subjected to a spatial Fourier transformation in a direction which is not perpendicular to a direction of movement of the moving bodies, are calculated in terms of a time series; and then the moving bodies are detected on the basis of changes occurring in the calculated spatial phases.

6 Claims, 13 Drawing Sheets

MOVING BODY DETECTION METHOD AND APPARATUS AND MOVING BODY COUNTING APPARATUS

BACKGROUND OF THE INVENTION

1. Field of the Invention

The present invention relates to a method and apparatus for detecting a moving body, and more particularly, to a method and apparatus for detecting persons passing through passages or entrances and exits of buildings by processing image signals obtained from a video camera.

2. Prior Art

FIG. 17 illustrates a moving body counting apparatus equipped with a conventional moving body detection apparatus that uses a video camera.

The video camera 11 is installed in a ceiling, etc., over a passage or entrance/exit of a building so that the camera looks down on a monitoring region through which moving bodies such as persons 20 passing through the passage or entrance/exit pass.

Images picked up by the video camera 11 are digitized by an A/D converter 12, and these digitized images are successively updated in a current image memory 13 at short time intervals, so that the most recent image is stored in the current image memory 13.

In addition, the output of the current image memory 13 is stored in an immediately-prior image memory 14, and this immediately-prior image memory 14 sends an image which is one frame prior to the image arriving from the current image memory 13 to a movement judging part 15.

The movement judging part 15 judges the presence or absence of a moving body by processing the current image stored in the current image memory 13 and the output of the immediately-prior image memory 14 which constitutes an image one frame prior to the current image; and moving body detection signals outputted by this movement judging part 15 are counted by a counting means 16, and the count value of this counting means 16 is outputted by an output device 17.

The method used to judge the presence or absence of a moving body in the above conventional moving body counting apparatus will be described in greater detail below.

FIG. 18 shows the image obtained by imaging a passing person. The reference numeral 92 refers to a current image stored in the current image memory 13, and 91 indicates the image one frame prior to the current image 92, i. e., the immediately-prior image stored in the immediately-prior image memory 14. In both of these images, a stationary image 82 is shown in the vicinity of the image 81 of the passing person in order to facilitate discrimination of the amount of movement of the image 81. The reference numeral 93 is the output of the movement judging part 15; and this output is an image (hereafter referred to as a "differential image") which is produced by taking the differences in brightness between the respective picture elements of the current image 92 and the immediately-prior image 91. In other words, the output is an image which has a differential region 94 (the area indicated by shading) in which the brightness varies between the current image 92 and the immediately-prior image 91. Furthermore, in order to simplify the description, a region in which there is no overlapping of images 81 of passing persons in the current image 92 and immediately-prior image 91 is shown as the differential region 94 in FIG. 18. In cases where the area of the differential region 94 (portion indicated by shading) in the differential image 93 exceeds a prescribed threshold value, a passing person 20 is judged to be present by the movement judging part 15. Thus, in the system illustrated in FIG. 18, the aggregate of the video camera 11, A/D converter 12, current image memory 13, immediately-prior image memory 14 and movement judging means 15 functions as a moving body detection apparatus. Next, when a differential region 94 having an area exceeding the threshold value crosses a counting line 95 set within the monitoring region 96, the counting means 16 performs a counting operation, and the result of this counting operation is outputted by the output device 17.

However, in the above conventional apparatus, the presence or absence of a passing person 20 is detected on the basis of a differential image 93 obtained by taking differences in brightness between the current image 92 and immediately-prior image 91. Accordingly, if there are changes in the intensity of illumination in the area being imaged by the video camera 11 or the sensitivity caused by the automatic exposure adjustment function of the video camera 11 changes, then regions where there is a change in brightness may be generated within the monitoring region 96 in spite of the fact that no image 81 of a passing person is present, and a detection signal indicative of a passing person 20 may be erroneously outputted. Accordingly, in such cases, the counting result outputted by the counting means 16 does not match actual conditions.

Furthermore, in the apparatus described above, two image memories are required, i. e., a current image memory 13 and an immediately-prior image memory 14, which respectively store the current image and an image one frame prior to the current image. Accordingly, it is disadvantageous in terms of cost.

Moreover, in cases where a plurality of moving bodies 20 pass by each other in close proximity, it is difficult to separate and discriminate the respective passing persons 20 as individuals at the instant at which these persons pass by each other; this also lowers the precision of the count.

In the prior art described above, the objectives of detection are passing persons 20. However, it goes without saying that similar problems arise in cases where moving bodies such as automobiles traveling along a road, etc. are detected.

SUMMARY OF THE INVENTION

Accordingly, the object of the present invention is to prevent any drop in the precision of detection caused by changes in the intensity of illumination in the area monitored by a video camera or changes in the automatic exposure adjustment function of the video camera.

It is another object of the present invention to reduce the number of expensive image memories required.

It is still another object of the present invention to make it possible to separate and discriminate moving bodies which move in a complicated manner so that the moving bodies pass each other in close proximity.

The objects of the invention are accomplished by a moving body detection method which detects moving bodies by processing image data for the moving bodies, and the method comprises:

a process to calculate spatial phases in terms of a time series, said spatial phases being obtained by the operational formula $\tan^{-1}(AS/AC)$ or $\cot^{-1}(AC/AS)$ (where AC is a Fourier cosine transformation and AS is a Fourier sine transformation) in a case where image signals obtained as aggregates of picture elements on the basis of picture element data constituting the image data are subjected to a spatial Fourier transformation in a direction which is not perpendicular to the direction of movement of the moving bodies; and a process to detect the moving bodies on the basis of changes in the calculated spatial phase.

In this method, since the spatial phase of each image signal obtained as an aggregate of picture elements changes as the moving body moves, the spatial phases are calculated as a time series; and the presence or absence of a moving body, as well as the direction of movement of the moving body, can be detected by monitoring changes in this calculated spatial phase.

The objects of the present inventions are further accomplished by a method characterized by the fact that "the aggregates of picture elements are respective blocks produced by dividing the image data into a plurality of lattice forms" in the method above, the presence or absence of blocks in which the direction of change of the spatial phases is different is determined by examining the changes in the spatial phases of the image signals on a block by block basis. In this way, moving bodies which are passing by each other can be detected.

In concrete terms, "brightness signals" may be used as the image signals obtained as aggregates of picture elements; alternatively, color signals may also be used.

Furthermore, the objects of the present invention are accomplished by a moving body detection apparatus which detects moving bodies by processing image data for the moving bodies, and the apparatus comprises:

a spatial phase calculating means which calculates spatial phases by means of the operational formula $\tan^{-1}$ (AS/AC) or $\cots^{-1}$ (AC/AS) (where AC is a Fourier cosine transformation and AS is a Fourier sine transformation) in a case where image signals obtained as aggregates of picture elements on the basis of picture element data constituting the image data are subjected to a spatial Fourier transformation in a direction Which is not perpendicular to the direction of movement of the moving bodies;

a spatial phase memory means which successively stores the output of the spatial phase calculating means at prescribed time intervals;

a spatial phase comparing means which compares the output of the spatial phase calculating means with the output of the spatial phase memory means storing the prior output of the spatial phase calculating means; and a movement judging means which judges the presence or absence of a moving body in the non-perpendicular direction in accordance with the output of the spatial phase comparing means.

In the present invention, changes in the phases obtained by subjecting the image signals to a Fourier transformation, i. e., changes in the spatial phases, are utilized in order to detect moving bodies. Accordingly, even if there are changes in the intensity of illumination in the area monitored by the video camera or changes in sensitivity caused by the automatic exposure adjustment function of the video camera, detection is unaffected by such changes.

Furthermore, in the present invention, moving bodies passing by each other can be detected merely by checking for the presence or absence of blocks in which the direction of change of the spatial phases is different. Accordingly, moving bodies passing by each other can be reliably separated and detected merely by noting differences in the direction of change of the spatial phase.

In addition, the invention presents a moving body detection apparatus which is unaffected by changes in the intensity of illumination in the area monitored by the video camera, etc. Furthermore, since the spatial phase memory means merely stores the spatial phases of image signals for respective aggregates of picture elements, there is no need for a large-capacity memory as in the case of an image memory; accordingly, the number of expensive image memories required can be reduced compared to conventional systems, which is advantageous in view of the manufacturing cost.

DETAILED DESCRIPTION OF THE INVENTION

Figure 1:
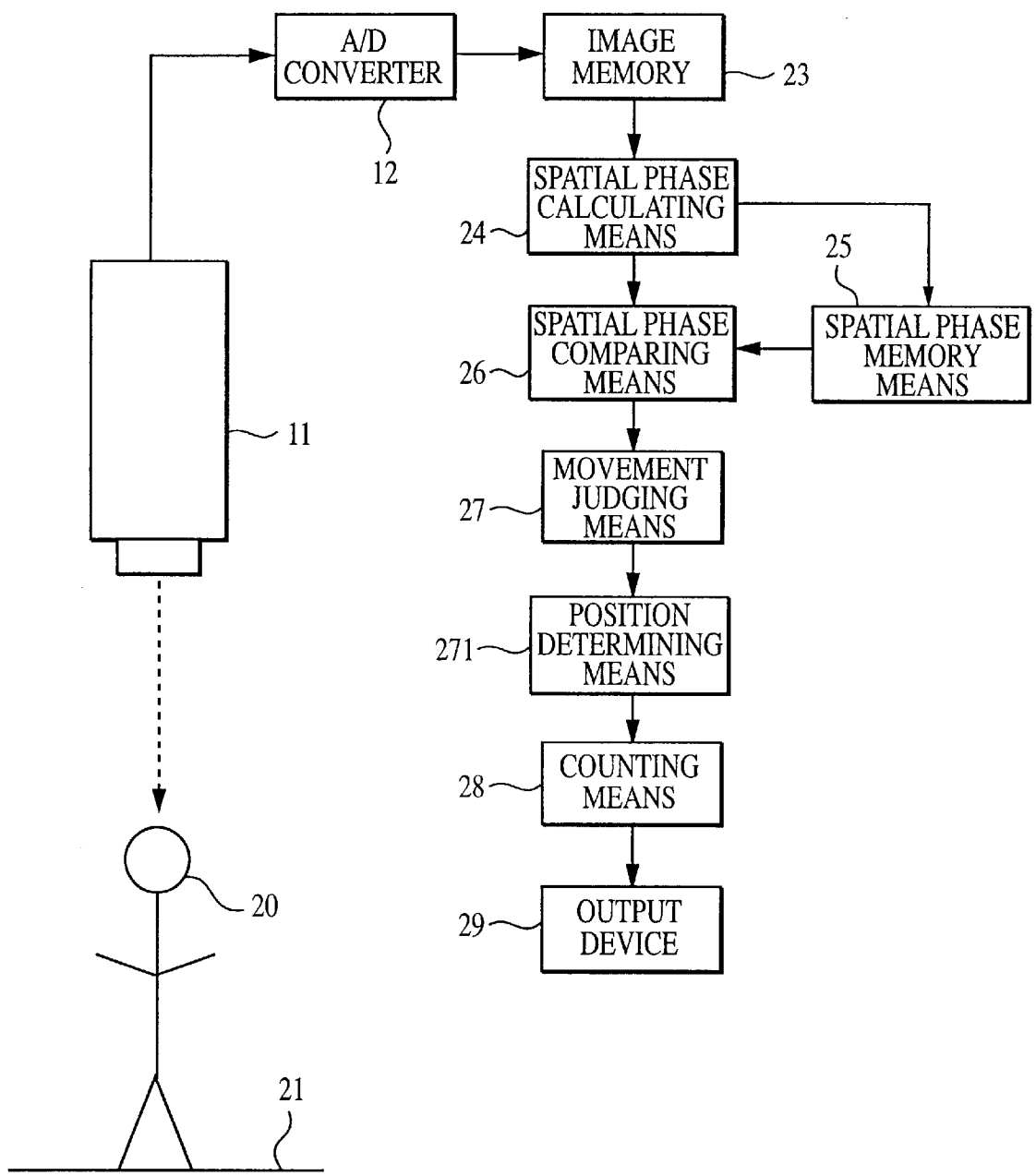
FIG. 1 is a schematic diagram illustrating a first embodiment.

FIG. 1 is a schematic diagram of a moving body counting apparatus according to the present invention.

Figure 2:
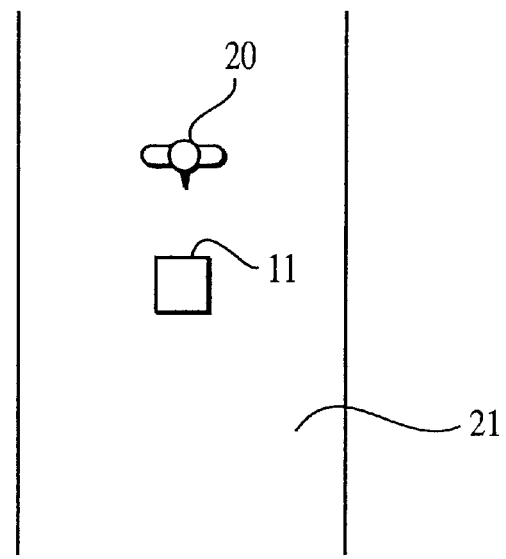
FIG. 2 is a plan view of the installation of the video camera in the first embodiment shown in FIG. 1.

As shown in FIGS. 1 and 2, a video camera 11 is installed above a passage 21 in a building, etc., so that the video camera 11 looks down on passing persons 20.

The analog output of the video camera 11 is subjected to A/D conversion by an A/D converter 12, and the resulting output is stored in an image memory 23. The output of the image memory 23 is applied to a spatial phase calculating means 24. This spatial phase calculating means 24 divides the images stored in the image memory 23 into several hundred lattice-form blocks, subjects brightness signals (or color signals) constituting image signals obtained from the picture elements making up the respective blocks to a spatial Fourier transformation, and calculates the phases (referred to as "spatial phases" in the present specification) resulting from the transformation.

The output of the spatial phase calculating means 24 is separately applied to a spatial phase memory means 25 and a spatial phase comparing means 26. The spatial phase memory means 25 stores spatial phases indicated by signals successively outputted from the spatial phase calculating means 24, the spatial phases corresponding to an image which is one frame prior to the current image stored by the image memory 23. Spatial phase changes for each block outputted by the spatial phase calculating means 24 and spatial phase memory means 25 are calculated by the spatial phase comparing means 26.

Furthermore, a movement judging means 27 is provided which judges the presence or absence of passing persons 20 on the basis of the spatial phase changes outputted by the spatial phase comparing means 26. Moving body detection signals outputted by the movement judging means 27 pass through a position determining means 271 which determines the center coordinates, etc. of the moving bodies and are counted by a counting means 28. The output of this counting means 28 is then outputted by an output device 29.

The respective constituent parts of the counting apparatus shown in FIG. 1 will be described in greater detail below.

First, as described above, the image signals picked up by the video camera 11 are successively converted by the A/D converter 12 and stored in the image memory 23.

Spatial Phase Calculating Means 24

The images stored in the image memory 23 are processed by the spatial phase calculating means 24.

Figure 3:
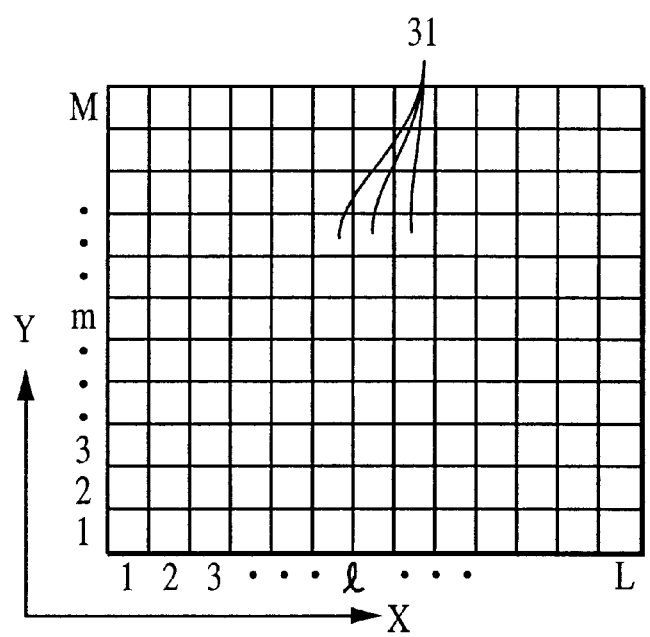
FIG. 3 is an explanatory diagram which illustrates the arrangement of the blocks obtained by dividing the images obtained from the video camera shown in FIG. 1.

As shown in FIG. 3, the spatial phase calculating means 24 divides the images stored in the image memory 23 into L equal parts in the direction of the horizontal X-axis, and M equal parts in the direction of the Y-axis which is perpendicular to the X-axis, thus dividing the images into a total of L×M (L times M) blocks 31 arranged in the form of a lattice. In this embodiment, each overall image is divided into several hundred blocks 31, and the direction of the Y-axis is assumed to be the direction in which the images of passing persons 20 move.

It is desirable that the above-described L and M be set at values which are such that the size of a passing person 20 be shown as several blocks to several tens of blocks.

The spatial phase calculating means 24 further calculates the spatial phase and amplitude of the brightness signal in each of the numerous blocks 31 formed as described above. These calculations are performed by a computer (not shown) in accordance with the flow chart shown in FIG. 4.

Next, the method to calculate the spatial phases, etc., will be described in detail.

First, in step ST1, the mean brightness $Y_A$ within each block 31 is determined. More specifically, assuming that I columns of picture elements are lined up in the direction of the X-axis and J rows of picture elements are lined up in the direction of the Y-axis within each block 31, and that $Y_{ij}$ is the brightness of the picture element located in the i-th position in the direction of the X-axis and the j-th position in the direction of the -Y-axis; then the mean brightness $Y_A$ can be determined using the following equation:

$$\text{Mean brightness } Y_A = (1/IJ)\Sigma_i \Sigma_j Y_{ij} \quad (1)$$

(Here, $\Sigma_i$ indicates the sum of i=1 through I, and $\Sigma_j$ indicates the sum of j=1 through J.)

Figure 4:
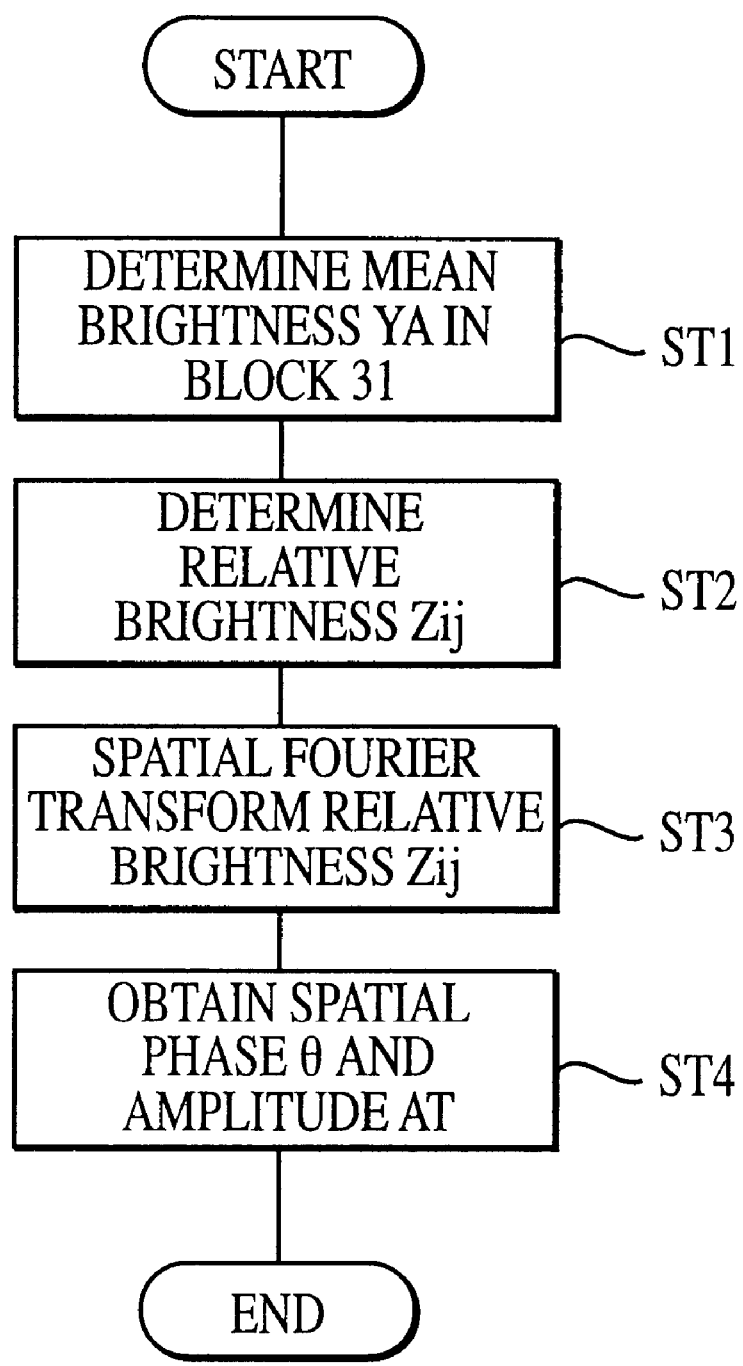
FIG. 4 is a flow chart which illustrates the order of the calculations performed in order to determine spatial phases in the spatial phase calculating means.

Accordingly, in step ST1 in FIG. 4, the computer performs the calculation shown in the Equation (1).

Next, in step ST2, the relative brightness $Z_{ij}$ of the respective picture elements are determined. In particular, the mean brightness $Y_A$ is subtracted from the brightness $Y_{ij}$ of each picture element, so that only the amount of variation of the brightness $Y_{ij}$ of each picture element with respect to the mean value is effective. Then, a window function is applied to these amounts of variation, so that weighting is applied which takes into account the positions of the respective picture elements within each block 31, thus determining the relative brightness $Z_{ij}$. This relative brightness $Z_{ij}$ can be expressed as follows in terms of a numerical formula:

$$\text{Relative brightness } Z_{ij} = W_{ij} (Y_{ij} - Y_A) \quad (2)$$

In the above formula, $W_{ij}$ is a window function which is introduced in order to lessen the effect of brightness signals from the peripheral portions of each block 31 in view of the fact that such brightness signals have a low reliability. For example, if this is shown only for the direction of the Y-axis, this function is such that values closer to the central portion of each block 31 increase, while values closer to the edge portions decrease, as shown in the left-hand portion of FIG. 5. In concrete terms, a function given by the following equation can be used:

$$W_{ij} = \min(\sin((i-0.5)\cdot\pi/I), \sin((j-0.5)\cdot\pi/J)) \quad (3)$$

Here, the function "min" is defined by the following equations:

$$\min(a, b) = a \text{ (where } a \leq b) \quad (4)\text{-A}$$

$$\min(a, b) = b \text{ (where } a > b) \quad (4)\text{-B}$$

When the window function $W_{ij}$ is obtained, the calculation of Equation (2) can be accomplished more quickly if the window function $W_{ij}$ is actually determined as follows: i. e., instead of causing the computer to perform the calculation shown in Equation (3), the calculation results obtained for window functions $W_{ij}$ calculated for all i and j are stored in the memory of the computer as a table beforehand, and the values in the table are used for the calculation of Equation (2).

Next, the relative brightness $Z_{ij}$ of Equation (2) determined in the step ST2 is subjected to a spatial Fourier transformation.

Figure 5:
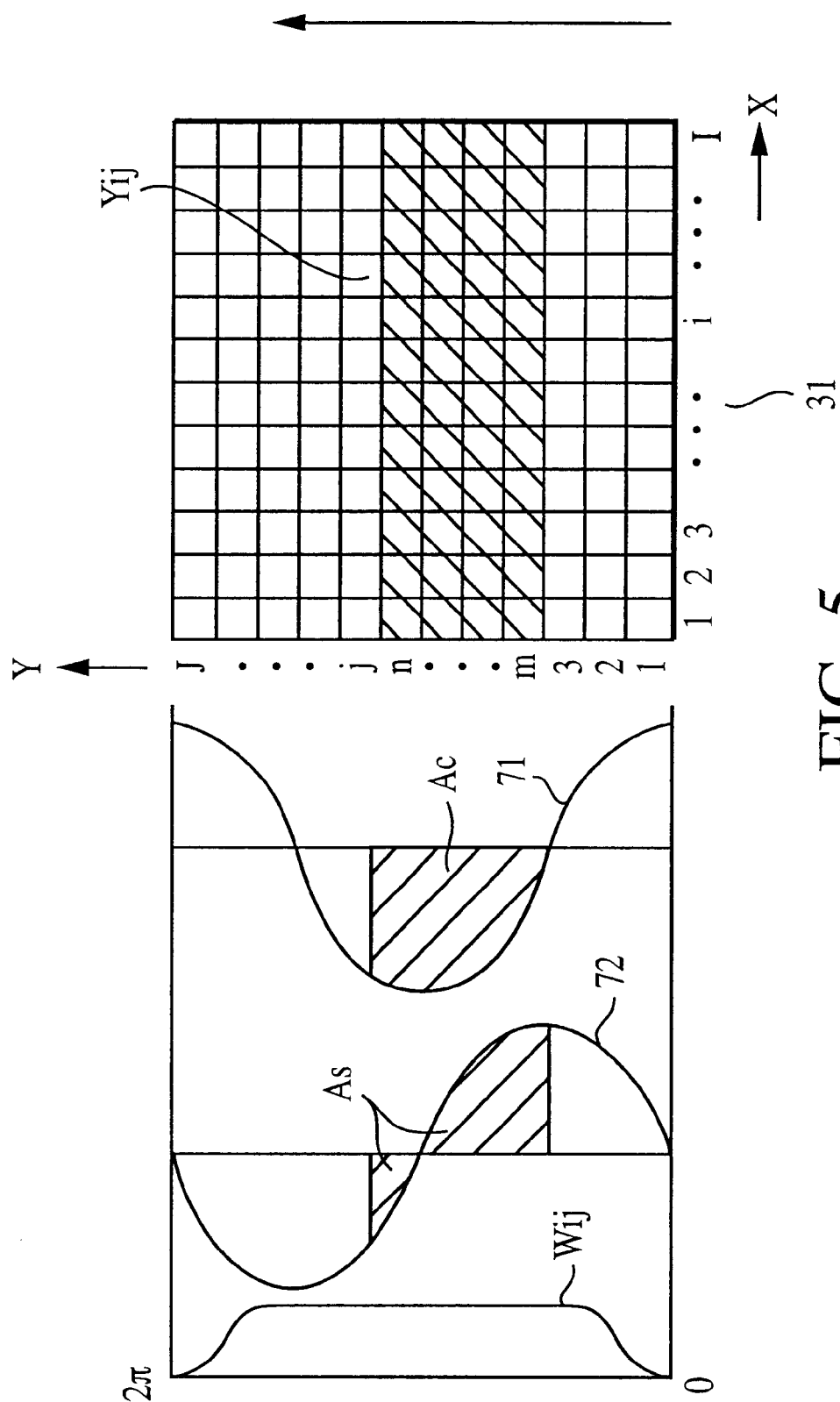
FIG. 5 is a schematic explanatory diagram illustrating the Fourier transformation performed in step ST3 of FIG. 4.

Assuming that passing persons 20 are moving in the positive direction or negative direction along the Y-axis in FIG. 5, spatial phase changes will occur in the direction of the Y-axis. Accordingly, the spatial Fourier transformation may be performed in the direction of the Y-axis.

Here, As is the sin wave component of the fundamental wave of the spatial Fourier transformation, i. e., the spatial Fourier sine transformation; and Ac is the cos wave component of the fundamental wave of the spatial Fourier transformation, i. e., the spatial Fourier cosine transformation. The term "fundamental wave of the spatial Fourier transformnation" refers to the sin wave and cos wave where the length of 1 period is exactly equal to the above-described J.

Accordingly, As and Ac are determined using the following equations:

$$As=\Sigma_j\{(\Sigma_i Z_{ij})\cdot\sin(2\pi\cdot(j-1)/J)\}/Y_A \quad (5)$$

$$Ac=\Sigma_j\{(\Sigma_i Z_{ij})\cdot\cos(2\pi\cdot(j-1)/J)\}/Y_A \quad (6)$$

In Equations (5) and (6), $\Sigma_i$ indicates the sum of i=1 through I, and $\Sigma_j$ indicates the sum of j=1 through J.

The reason that the right-hand sides of the equations are divided by the mean brightness $Y_A$ when As and Ac are determined in Equations (5) and (6) is that this makes it possible to determine As and Ac without the results being affected by environmental conditions such as changes in the intensity of illumination in the area monitored by the video camera 11 or changes in sensitivity caused by the automatic exposure adjustment function of the video camera 11. In regard to the sin function and cos function in Equations (5) and (6), calculations can be accomplished more quickly by storing the calculation results for the sin function and cos function calculated for all i and j as a table in the memory of the computer beforehand, and using the values in this table for the calculations.

Next, step ST4 in FIG. 4 is executed, so that the spatial phase θ and amplitude AT of signals obtained by adding the relative brightness $Z_{ij}$ for all i are determined by means of the following equations using As and AC obtained from the Equations (5) and (6):

$$\theta=\tan^{-1}(As/Ac)(\text{where } AC>0) \quad (7)\text{-A}$$

$$\theta=\tan^{-1}((As/Ac)+\pi)(\text{where } Ac<0 \text{ and } As\leq 0) \quad (7)\text{-B}$$

$$\theta=\tan^{-1}((As/Ac)-\pi)(\text{where } Ac<0 \text{ and } As<0) \quad (7)\text{-C}$$

In the above, the theory by which the spatial phases of brightness signals can be determined using the Equations (7)-A through (7)-C may be understood, for example, from the description in *"Gazo Shori Oyo Gijutsu"* [*"Applied Technology of Image Processing"*] (edited by Hiroshi Tanaka, published by Kogyo Chousakai K.K.). More specifically, on page 64 of this work (line 6 from the bottom to line 5 from the bottom), it is indicated that "in the case of parallel movement of (a, b) with respect to an image f, F (the Fourier transformation) shows a phase change of exp {−2πi ((au/M)+(bu/N))} . . . ". It will be understood that the "phase" in this description, i. e., the spatial phase, is the θ value determined by means of $\tan^{-1}$ of the ratio of the Fourier cosine transformation to the Fourier sine transformation. It will be understood from this that the spatial phase has a correlation with the position of picture elements representing the image of a passing person within each block 31.

Furthermore, spatial phases can also be determined using the calculation formula $\theta=\cot^{-1}(Ac/As)$.

$$\text{Amplitude } AT=(As^2+Ac^2)^{1/2} \quad (8)$$

Thus, the spatial phases θ and amplitudes AT of brightness signals extracted from the picture elements appearing in the respective blocks 31 are determined for all of the blocks 31 by the spatial phase calculating means 24 (see FIG. 1).

Spatial Phase Memory Means 25

The spatial phases θ and amplitudes AT for all of the blocks 31 determined by the spatial phase calculating means 24 are successively transmitted to the spatial phase memory means 25 and spatial phase comparing means 26 at short time intervals and are processed by these parts. The spatial phase memory means 25, on the other hand, stores the spatial phases θ and amplitudes AT (i. e., the output of the spatial phase calculating means 24) for all of the blocks 31 obtained by the operational processing of the image one frame prior to the image currently output by the image memory 23. In other words, it is sufficient if the spatial phase memory means 25 has a capacity capable of storing the spatial phase θ and amplitude AT for each of the several hundred blocks 31 into which the image is divided. Accordingly, a memory such as the image memory 23, which is expensive due to its large capacity, is not required in the case of this spatial phase memory means 25. Thus, in this embodiment, since only a single image memory 23 is required, the apparatus can be manufactured more inexpensively than conventional systems requiring two image memories.

Spatial Phase Comparing Means 26

For each block 31, the spatial phase comparing means 26 compares the spatial phase θ outputted by the spatial phase calculating means 24 and the output of the spatial phase memory means 25, which constitutes the corresponding spatial phase θ obtained from the image 1 frame prior to the output of the spatial phase calculating means 24. The spatial phase comparing means 26 determines the amount of change in the spatial phase θ over time, and the direction of the change, for each block 31. As a result, it can be judged how the images of passing persons 20 move within each block 31. In this judgment, information indicating the amplitude AT is also utilized in order to improve the precision of the judgment.

Figure 6A:
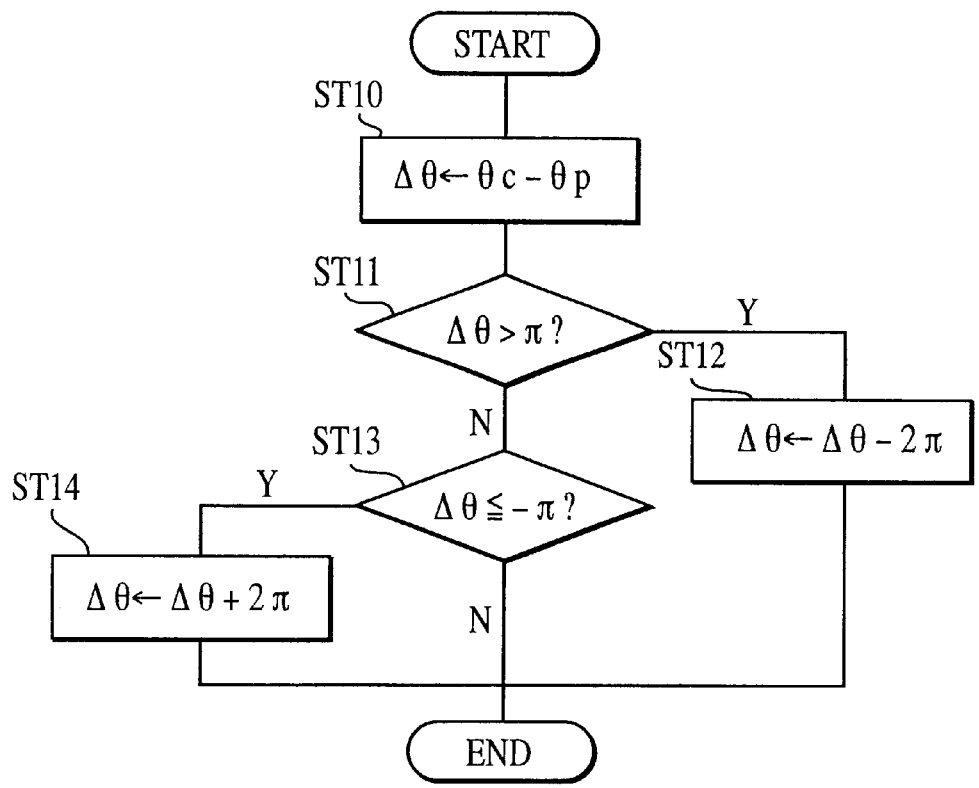
FIG. 6(a) is a flow chart which illustrates the method used to determined the phase difference $\Delta\theta$ between spatial phases in the spatial phase comparing means shown in FIG. 1.
Figure 6B:
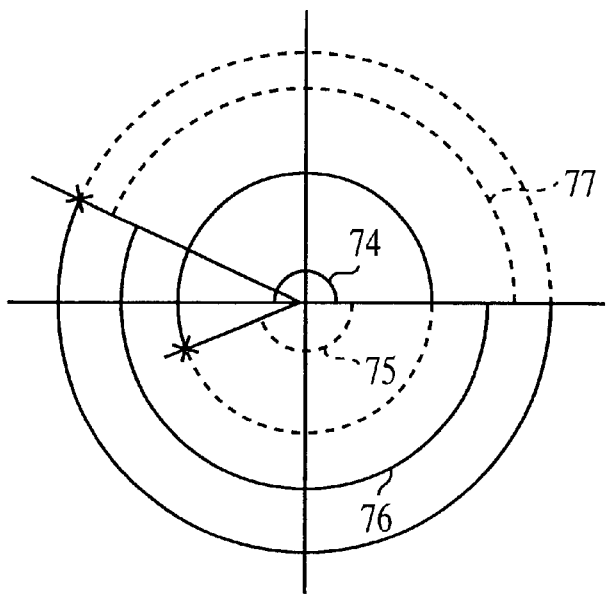
FIG. 6(b) shows phase differences.

The phase difference Δθ constituting the amount of change in each spatial phase is calculated by the spatial phase comparing means 26 according to the flow chart shown in FIG. 6(a) using the current spatial phase θc outputted by the spatial phase calculating means 24 and the immediately-prior spatial phase θp (which is one frame prior to the current spatial phase) outputted by the spatial phase memory means 25. In the flow chart shown in FIG. 6(a), processing is performed so that the absolute value of the phase difference Δθ is kept within π rad (180°). More specifically, as shown in FIG. 6(b), if it is confirmed in step ST1 that the phase difference Δθ is a first phase difference 74 whose value is greater than π, a second phase difference 75 obtained by subtracting 2π from this is re-stored as the phase difference Δθ in step ST12. Furthermore, if it is confirmed in steps ST11 and ST13 that the phase difference Δθ is a third phase difference 76 whose value is smaller than −π, a fourth phase difference 77 obtained by adding 2π to this is re-stored as the phase difference Δθ in step ST14.

Next, a judgment as to whether the image of a passing person 20 appearing in respective blocks is moving or not is made by the spatial phase comparing means 26 on the basis of the phase difference Δθ (as the difference between the output of the spatial phase calculating means 24 and the output of the spatial phase memory means 25), the amplitude AT currently outputted by the spatial phase calculating means 24 (hereafter referred to as the "current amplitude $A_{TC}$"), and the amplitude AT determined from the image one frame prior to the image corresponding to the above current amplitude $A_{TC}$, and stored in the spatial phase memory means 25 (hereafter referred to as the "immediately-prior amplitude $A_{TP}$").

In other words, the spatial phase comparing means 26 judges the movements of images appearing in the respective blocks 31. Here, the processing action will be described separately for respective image conditions.

Figure 7:
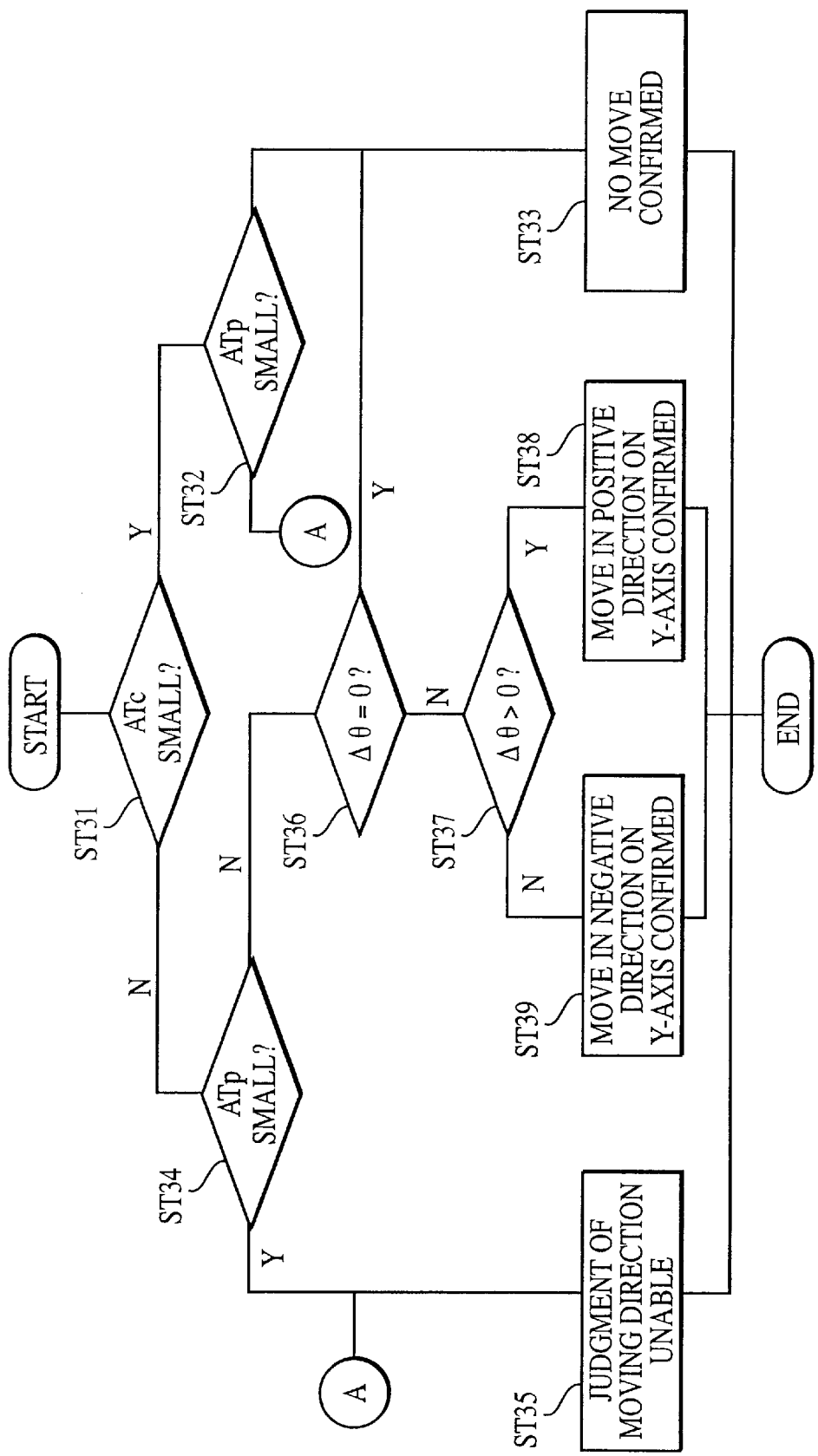
FIG. 7 is a flow chart which illustrates the method used by the spatial phase comparing means shown FIG. 1 to judge the movements of images appearing in respective blocks.

In FIG. 7, in order to improve the precision of the detection of moving bodies, it is arranged so that the image is judged to be stationary through the successive steps ST31, ST32 and ST33 in cases where the current amplitude $A_{TC}$ and immediately-prior amplitude $A_{TP}$ are small. More specifically, in cases where both of the amplitudes $A_{TC}$ and $A_{TP}$ are small, this means that the brightness within the block 31 in question is substantially uniform. Since there is a high probability that such a state is attributable to the floor surface, it is judged that the image is stationary, and no movement detection signal is outputted. Furthermore, in cases where the current amplitude $A_{TC}$ is not small, but the immediately-prior amplitude $A_{TP}$ is small, then a judgment is made through the successive steps ST31, ST34 and ST35 that the direction of movement of the image cannot be ascertained. In such cases as well, however, the fact that the image is moving is confirmed, and information indicating this is sent to the movement judging means 27 (described later). Furthermore, the block 31 corresponding to this information is subjected to block grouping (described later) together with other adjacent blocks 31 (as a common group) in which the direction of movement of the image has been confirmed.

(A) Case in which an image within a block 31 is stationary:

In this case, the image is judged to be stationary through steps ST36 and ST33, and a signal indicating this judgment is outputted.

(B) Case in which an image within a block 31 is moving in the positive direction along the Y-axis (upward in FIG. 3):

In this case, steps ST36, ST37 and ST38 are performed, and a signal indicating that the image is moving in the direction of movement is outputted.

(C) Case in which an image within a block 31 is moving in the negative direction along the Y-axis (downward in FIG. 3):

In this case, steps ST36, ST37 and ST39 are performed, and a signal indicating that the image is moving in the direction of movement is outputted.

The processing of the steps ST31 through ST39 is performed for all of the blocks 31, and signals indicating the above-described cases (A) through (C), etc., are transmitted to the movement judging means 27 (described later) for each of the blocks 31.

The judgment precision can be improved if the judgments corresponding to the processing shown in the flow chart in FIG. 7 are performed using fuzzy rules.

Movement Judging Means 27

When the direction of movement of images appearing in respective blocks 31 is determined for each block 31 by the spatial phase comparing means 26, the movement judging means 27 groups together blocks 31 which are in close proximity to each other and which show a commonality in terms of the direction of movement of the images, thus created images of passing persons. Furthermore, the movement judging means 27 checks the center coordinates and direction of movement, etc., of these images of passing persons.

Figure 9:
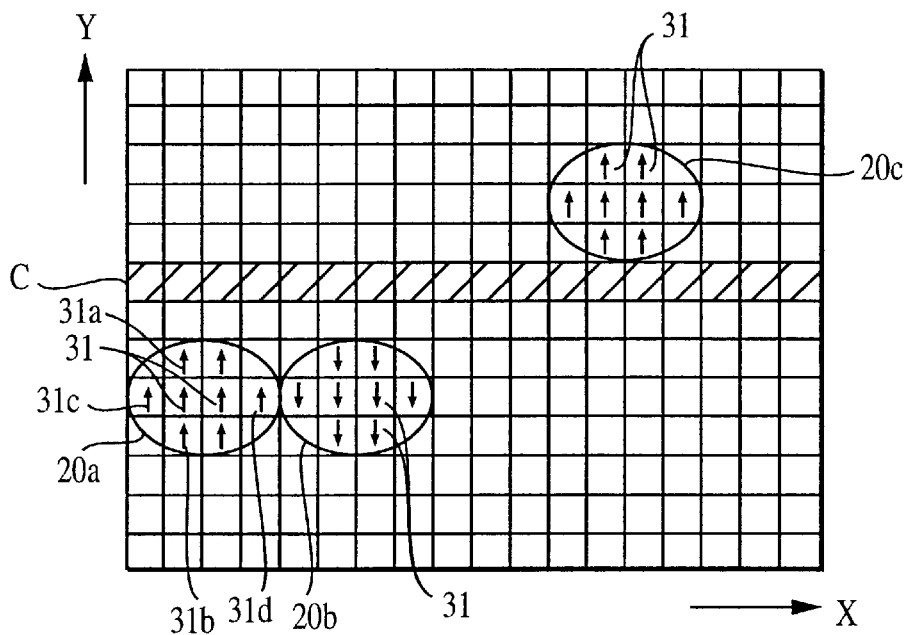
FIG. 9 is an explanatory diagram which shows the direction of variation of the spatial phases in respective blocks.
Figure 10:
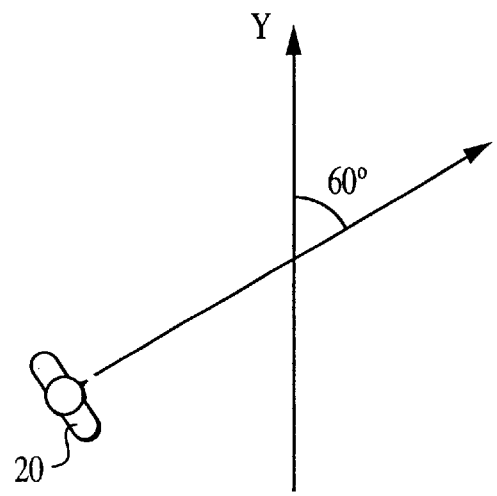
FIG. 10 is a plan view showing a passing person, an object of detection, moving in a direction which crosses the Y-axis.

An example of the detection of passing persons 20 is shown in FIG. 9.

Images of three passing persons 20a, 20b and 20c are shown in FIG. 9. The images of passing persons 20a and 20b are passing by each other in the positive and negative directions along the Y-axis, while the image of the passing person 20c is moving in the positive direction along the Y-axis through a position slightly removed from the area where the images are passing by each other.

The arrows shown in the respective blocks 31 indicate the directions of movement of the images of passing persons 20a, 20b and 20c appearing in the blocks 31. Accordingly, the orientation of the arrows shown inside the respective blocks 31 in which the images of passing persons 20a and 20c appear indicates that the phase differences $\Delta\theta$ found for these blocks are positive, while the orientation of the arrows shown inside the respective blocks 31 in which the image of the passing person 20b appears indicates that the phase differences $\Delta\theta$ found for these blocks are negative.

Figure 8:
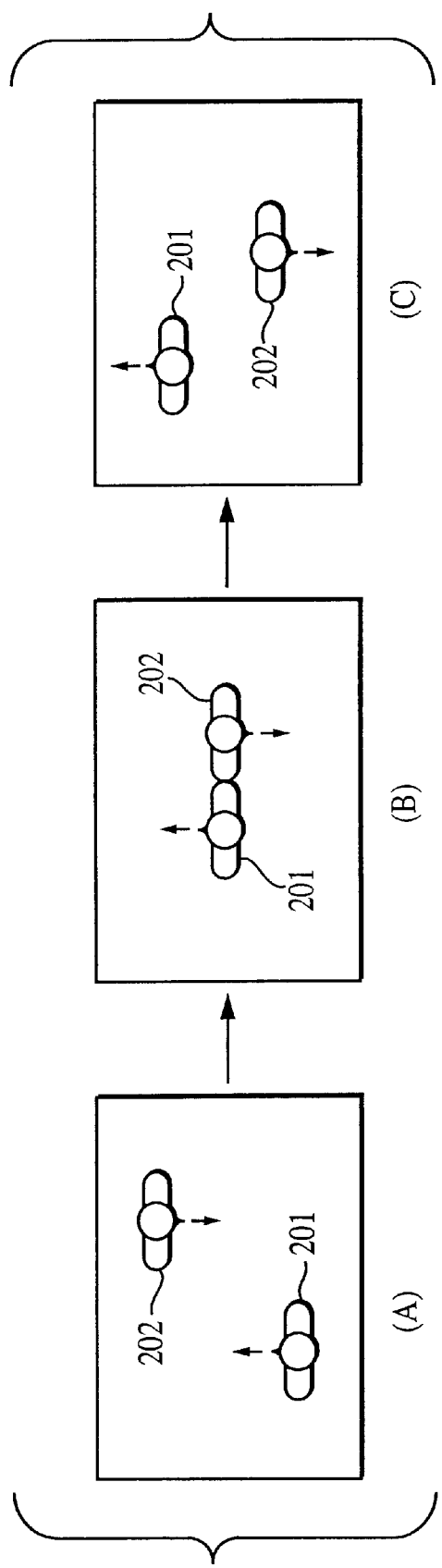
FIG. 8 illustrates how images of persons passing by each other are detected by the detection apparatus shown in FIG. 1.

Accordingly, the movement judging means 27 recognizes one group of blocks 31 which are in close proximity to each other and which show the same direction of movement as the image of a single passing person 20a, etc. As a result, the presence of the passing person 20a is detected. Meanwhile, in regard to the images of passing persons 20a and 20b in FIG. 9, the movement judging means 27 notes that the phase differences $\Delta\theta$ for these images are respectively positive and negative in spite of the fact that the images are in close proximity to each other. Accordingly, it is seen that the movement judging means 27 can detect these images separately as individual images. Thus, persons 201 and 202 passing by each other in close proximity as shown in FIG. 8 can be separately detected as individuals; and as a result, the detection precision in such cases is improved compared to that seen in conventional systems.

In cases where images of passing persons 20a and 20b are moving in the same direction in close proximity to each other, no positive-negative difference in the phase difference $\Delta\theta$ is generated; thus, these images cannot be separately detected by the above method. In this case, however, since the area of the images of the passing persons 20a and 20b (i.e., the number of blocks 31) required in order to show one passing person) and the width in the direction of the X-axis (number of blocks in the direction of the X-axis), etc. are known in advance, a plurality of persons moving in the same direction can be separated and detected as individuals by judging the size of the area, etc.

Accordingly, in the embodiment above, the aggregate of the video camera 11, A/D converter 12, image memory 23, spatial phase calculating means 24, spatial phase memory means 25, spatial phase comparing means 26 and movement judging means 27 constitutes a moving body detection apparatus.

Position Determining Means 271

When a passing person 20 is detected by the movement judging means 27, the resulting signal is sent to the position determining means 271.

The position determining means 271 determines the center coordinates G of the group of blocks 31 in which the image of a passing person 20 appears (i.e., the center coordinates of the image of the passing person), as well as spatial phase variations consisting of the direction of movement (i.e., the positive or negative value of the phase difference $\Delta\theta$) and speed of movement (magnitude of the phase difference $\Delta\theta$), etc. Furthermore, the position determining means 271 also determines the area and width, etc. of the image.

The center coordinates G are determined by, for instance, the following method: In the blocks 31 belonging to the image of the passing person 20a in FIG. 9, where $Y_1$ is the order number (from the origin) of the block 31a which is positioned furthest forward in the direction of the Y-axis, and $Y_2$ is the order number of the block 31b which is positioned furthest rearward in the direction of the Y-axis, the center coordinate $Y_G$ in the direction of the Y-axis is determined as, for example, "$Y_G=((Y_1+Y_2)/2)$". Furthermore, where $X_1$ is the order number (from the origin) of the block 31a which is positioned furthest forward in the direction of the X-axis, and $X_2$ is the order number of the block 31b which is positioned furthest rearward in the direction of the X-axis, the center coordinate $X_G$ in the direction of the X-axis is determined as, for example, "$X_G=((X_1+X_2)/2)$". Accordingly, the center coordinates G of the image of the passing person 20a are (XG, YG).

The center coordinates G can also be determined as follows: Assuming that there are A blocks 31 (A being the number of the blocks) in which the image of a passing person 20 appears, and that the coordinates of the a-th block 31 are $(X_a, Y_a)$, then the center coordinates G $(=X_G, Y_G)$ can be determined as $X_G=(1/A)\Sigma_a X_a$, $Y_G=(1/A)\Sigma_a Y_a$. Here, $\Sigma_a$ indicates the sum of a=1 through A. If the center coordinates G are determined using these equations, the precision of the calculated results is greatly improved compared to cases where the previously described equations are used.

Data such as the center coordinates G, etc. determined by the position determining means 271 are transmitted to the counting means 28.

Counting Means 28

The counting means 28 tracks the respective passing persons 20 on the basis of the data sent from the movement judging means 27, and when the center coordinates G coincide with a group of picture elements (corresponding to the "reference picture elements" described in claim 5) (see FIG. 9) indicating a counting line C that is pre-set in the overall image, then this is counted by the counting means 28. In other words, the counting means 28 performs a counting operation whenever the order number C (in the direction of the Y-axis from the origin) of the picture element group corresponding to the counting line C coincides with the center coordinates G. It would also be possible to perform a counting operation whenever the center coordinates pass the counting line C.

Output Device 29

The count that is outputted by the counting means 28 is sent to the output device 29. This count may then be displayed on a display, or may be outputted to the outside by the output device 29 using methods such as the transmission of data to other devices via an electrical interface, etc.

An experiment was performed in which the movement of moving bodies detected by processing image data using the method described above, and it was confirmed that the results of the above-described processing showed highly precise agreements with the actual directions of movement and movement speeds of the moving bodies. In other words, it was experimentally confirmed that the detection of moving bodies can be accomplished using phase variations in the fundamental wave alone, without using harmonic components (sin and cos waves which are such that the length of a plurality of periods is equal to the above-described J) as described above.

In the above embodiment, data indicating the brightness obtained from the images of passing persons 20 ($\Sigma$ relative brightness $Z_{ij}$) is subjected to a spatial Fourier transformation in the direction of the Y-axis, based on the assumption that passing persons 20 are moving in the direction of the Y-axis. However, it has been also experimentally confirmed that phase differences $\Delta\theta$ constituting spatial phase variations in the direction of the Y-axis can be detected even in cases where passing persons 20 move in a direction forming an angle of 60 degrees with the direction of the Y-axis.

Figure 11:
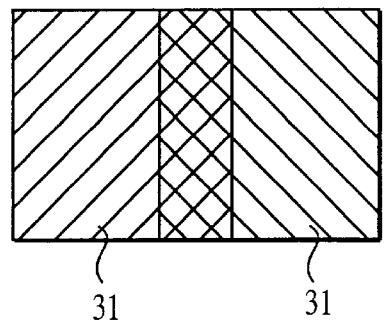
FIG. 11 is an explanatory diagram which illustrates the overlapping of the edge portions of respective blocks in FIG. 9.

For the sake of convenience in description, the regions of adjacent blocks 31 in FIG. 3 are set so that there is no mutual overlapping of the blocks 31. In actuality, however, regions are set in which there is overlapping between adjacent blocks 31 as shown in FIG. 11, and counting can be performed with high precision by including these overlapping regions in the Fourier transformation.

Figure 12:
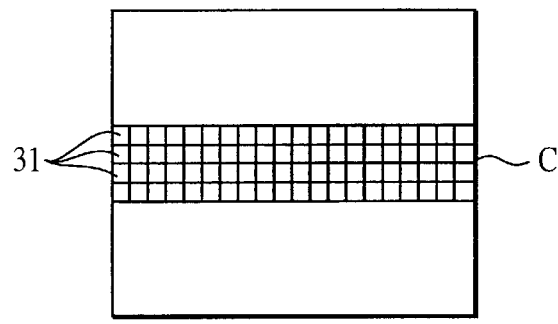
FIG. 12 is an explanatory diagram which illustrates the setting of blocks constituting objects of processing in the vicinity of the counting line in the images obtained by means of the video camera shown in FIG. 1.

Moreover, the amount of processing required can be reduced by setting blocks 31 that are to be processed only in the vicinity of the counting line C set in the image as shown in FIG. 12. In some cases, it may be necessary to process only one row of blocks 31 lined up in the direction of the X-axis.

Another utilization of the moving body detection apparatus of the present invention will be described below.

In cases where the amount of traffic flow is to be investigated under conditions in which passing persons 20 move in a complex manner, as in, for instance, station concourses and public squares, a plurality of video cameras 11a through 11f are installed in the longitudinal and lateral directions in the ceiling, etc., over the area to be monitored.

Figure 14:
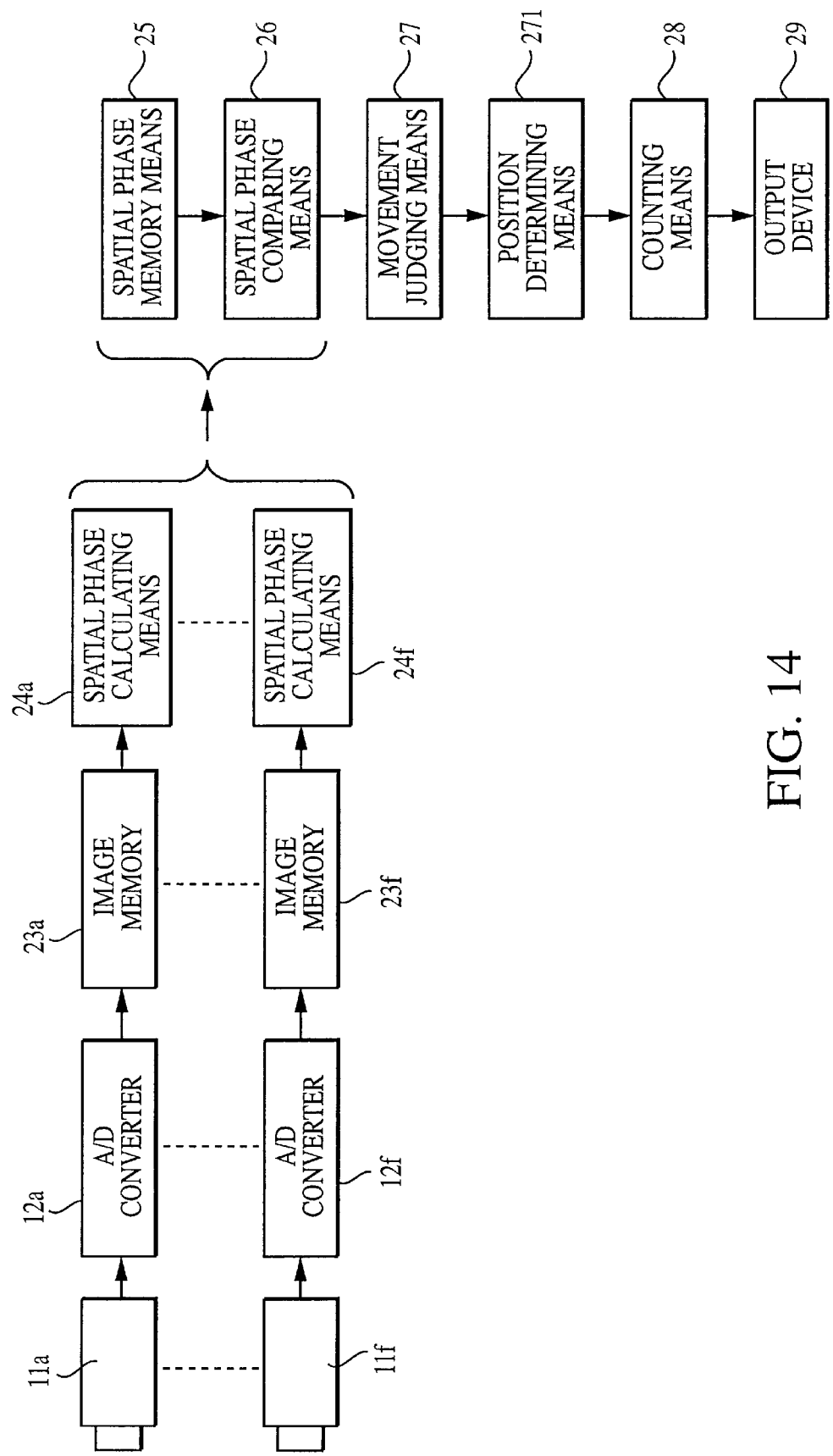
FIG. 14 is a schematic diagram illustrating the processing of data in the traffic flow survey shown in FIG. 13.

FIG. 14 shows a schematic diagram illustrating a case in which traffic flow is investigated using respective video cameras 11a through 11f.

Figure 15:
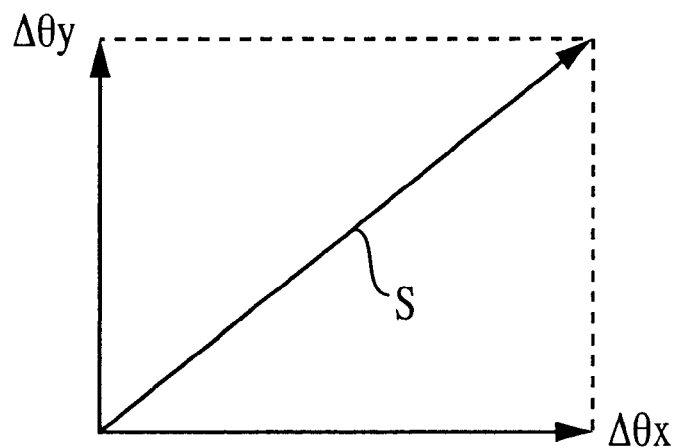
FIG. 15 is an explanatory diagram which illustrates movement direction vectors obtained by subjecting image signals to Fourier transform in two perpendicular axial directions.
Figure 16:
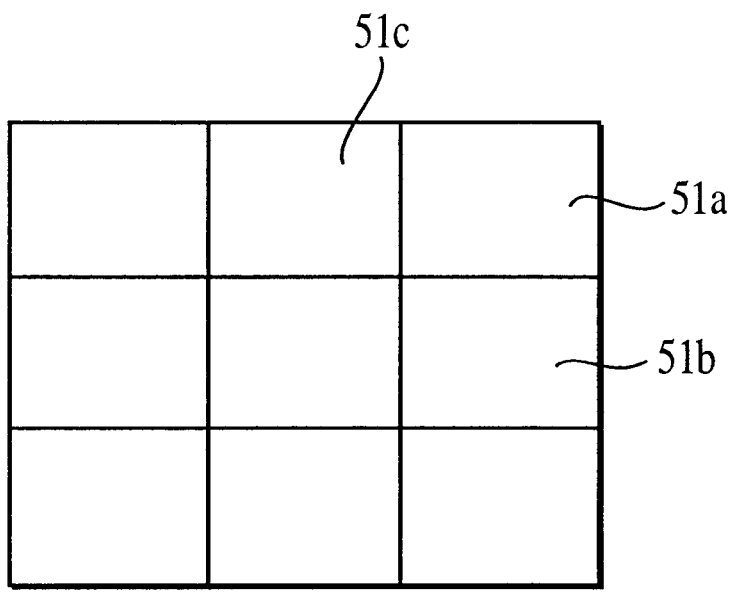
FIG. 16 is an overall image diagram illustrating the combination of images obtained from respective video cameras in the traffic flow survey shown in FIG. 13.
Figure 17:
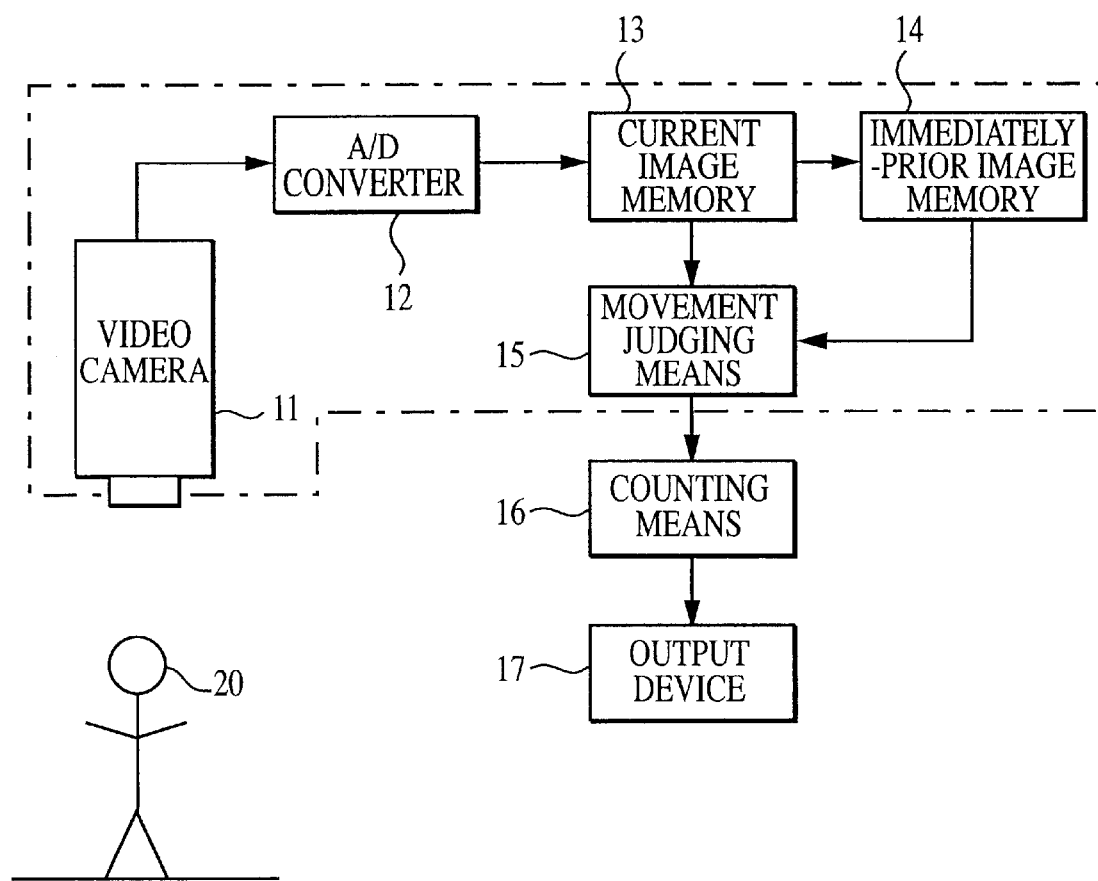
FIG. 17 is a schematic diagram of a conventional moving body counting apparatus.
Figure 18:
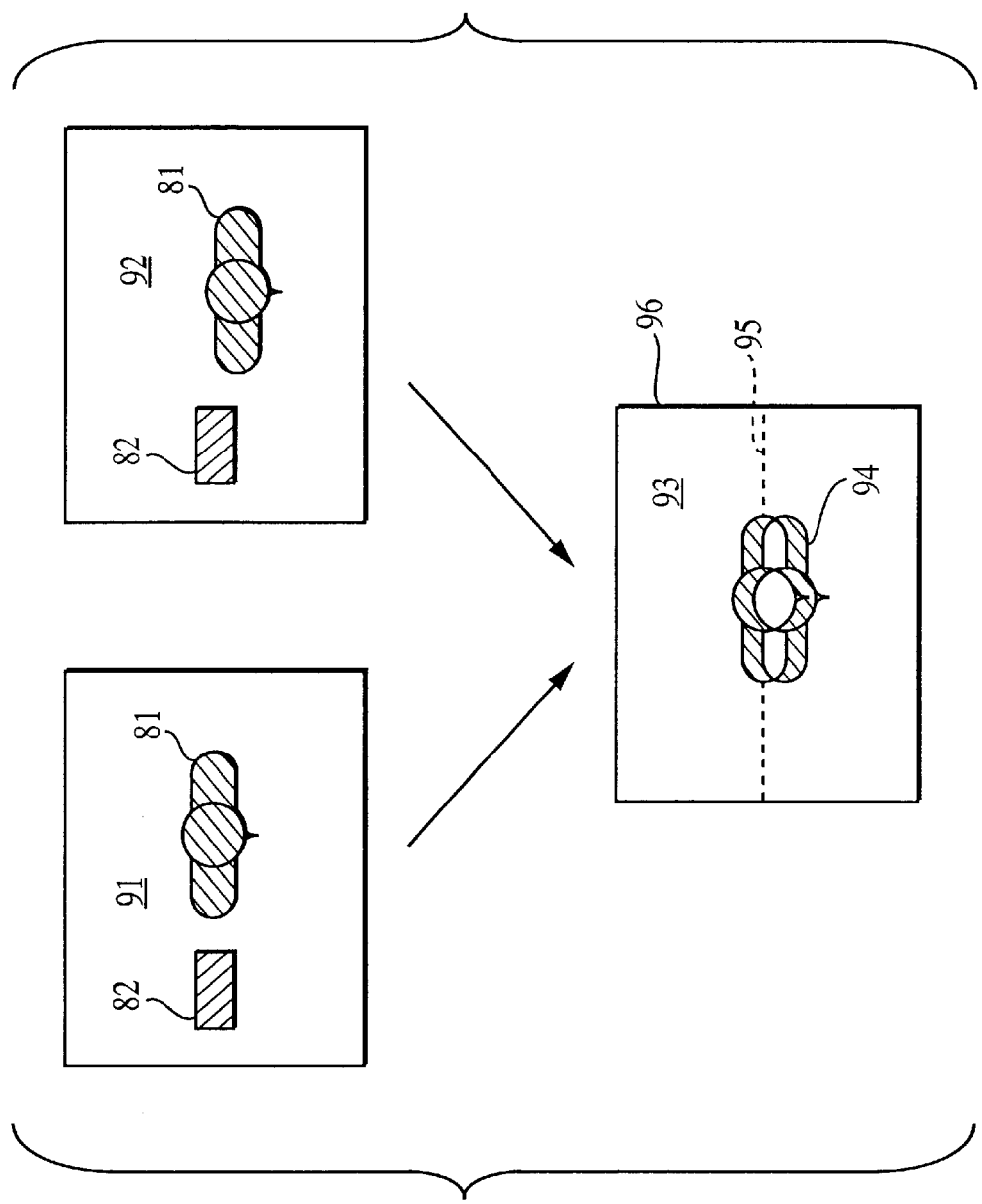
FIG. 18 is a diagram illustrating a conventional moving body detection method which uses differential images.

The data processing method used in this case is essentially the same as in the case described above with reference to FIG. 1. Here, A/D converters 12a through 12f, image memories 23a through 23f and spatial phase calculating means 24a through 24f are provided for the respective video cameras 11a through 11f, and all of the blocks obtained by dividing the images from the respective video cameras 1 Is through I if are subjected to the spatial Fourier transformations by the spatial phase calculating means 24a through 24f In this case, since the directions of movement of the passing persons are irregular, spatial Fourier transformations are performed in two directions, i. e., in the directions of the perpendicular X and Y axes, in each block, as shown in FIG. 15. As a result, a phase difference lateral component $\Delta\theta x$ and a phase difference longitudinal component $\Delta\theta y$ which constitute the spatial phase variations in the two directions are determined, so that the directions of movement S, etc. of the passing persons can be judged. Then, overall data is, as shown in FIG. 16, completed by combining data 51a, 51b and 51c indicating spatial phase variations, etc., obtained from the respective spatial phase calculating means 24a through 24f, and this data is transmitted to a common spatial phase memory means 25 and spatial phase comparing means 26. Accordingly, information indicating the spatial phases, etc. one frame prior to the current spatial phases calculated by the respective spatial phase calculating means 24a through 24f is stored in the common spatial phase memory means 25, and the output of this spatial phase memory means 25 and the outputs of the spatial phase calculating means 24a through 24f are processed by the spatial phase comparing means 26. Afterward, processing is performed in the same manner as in the case in which a single video camera 11 is installed, and the flow of passing persons in the overall square, etc. which is being monitored can be surveyed by appropriate manipulation of the processed data.

Figure 13:
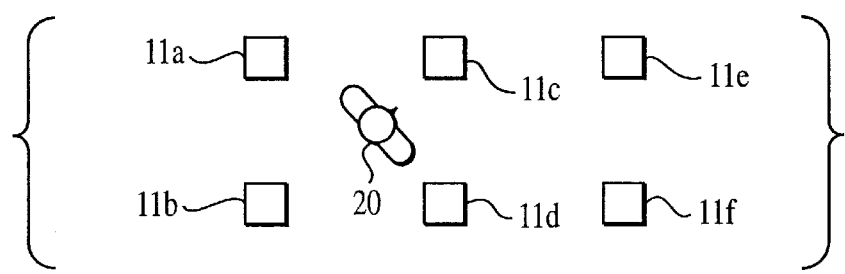
FIG. 13 is an explanatory diagram which illustrates the arrangement of video cameras in a case where the present invention is used to survey traffic flow.

In FIG. 13, a plurality of video cameras 11a through 11f are used; however, in cases where the area to be monitored is comparatively small, it would be possible to install a single video camera 11 and to calculate spatial phase differences $\Delta\theta$ and $\Delta\theta y$ in the directions of the X and Y axes for image signals obtained by means of this video camera 11.

Moreover, in cases where calculations using Fourier transformations are performed, the speed of the calculations can be increased by using a summing operation. Accordingly, a method using such a summing operation is employed for practical reasons.

Summing refers to an operation which determines $\Sigma_i a_i b_i$ (here, $\Sigma_i$ indicates the sum of i=1 through I) in a case where two number series, i. e., $a_1, a_2, \ldots, a_I$ and $b_1, b_2, \ldots, b_I$, are given. Such a summing operation is used in signal processing known as filtering. In recent years, high-speed filtering has become necessary in industrial applications. Accordingly, calculators known as DSP (digital signal processors), which can perform summing operations at a high speed, have been developed; and the calculation of optical flow (movement vectors of the images of moving bodies on the screen) by means of Fourier transformations can be accomplished at high speed using such a DSP.

Next, the calculation of optical flow by means of Fourier transformations based on a summing operation will be described.

The sin wave component As and cos wave component Ac of the Fourier transformation are determined using the following equations, which are shown above as equations (2), (5) and (6).

$$Z_{ij}=W_{ij}(Y_{ij}-Y_A) \quad (2)$$

$$As=\Sigma_j\{(\Sigma_i Z_{ij})\cdot\sin(2\pi\cdot(j-1)/J)\}/Y_A \quad (5)$$

$$Ac=\Sigma_j\{(\Sigma_i Z_{ij})\cdot\cos(2\pi\cdot(j-1)/J)\}/Y_A \quad (6)$$

If $D_j$ is defined as $$D_j=\Sigma_i Z_{ij}=\Sigma_i W_{ij}(Y_{ij}-Y_A)=\Sigma_i W_{ij}\cdot\Delta Y_{ij} \quad (9)\text{-A}$$

(Here, $\Delta Y_{ij}=Y_{ij}-Y_A$.)

by transforming the Equation (2), then As and Ac can be expressed as follows:

$$As=(\Sigma_j D_j\cdot S_j)/Y_A \quad (9)\text{-B}$$

$$Ac=(\Sigma_j D_j\cdot C_j)/Y_A \quad (9)\text{-C}$$

Here, $S_j=\sin(2\pi\cdot(j-1)/J)$, and $Cj=\cos(2\pi\cdot(j-1)/J)$

In this case, $\Delta Y_{ij}$ represents the differences between the brightness $Y_{ij}$ of the respective picture elements and the mean brightness $Y_A$, and it requires almost no time for calculation. Furthermore, $S_j$ and $C_j$, values can be prepared beforehand in numerical tables; accordingly, there is no need to calculate these values.

Looking at Equation (9)-A, it is seen that $D_j$ can be determined by a summing operation of $W_{ij}$ and $\Delta Y_{ij}$; furthermore, an examination of Equation (9)-B shows that As and Ac can be determined by performing respective summing operations of $D_j$ and $S_j$, and of $D_j$ and $C_j$, and dividing the respective results by $Y_A$.

Thus, Fourier transformations can be performed using summing operations and the Equations (9)-A through (9)-C, which substantially have the form of summing operations. Furthermore, if Fourier transformations are performed using the Equations (9)-A through (9)-C, then high-speed calculations utilizing the DSP become possible, and a moving body detection apparatus which is suitable for practical use can be obtained.

What is claimed is:

1. A moving body detection method which detects a plurality of unmarked moving bodies by processing image data for the plurality of moving bodies, said method comprising:

determining a mean brightness from the image data;

calculating spatial phases in terms of a time series, said spatial phases being obtained by an operational formula $\tan^{-1}$ (AS/AC) or $\cot^{-1}$ (AC/AS) (where AC is a Fourier cosine transformation divided by the mean brightness and AS is a Fourier sine transformation divided by the mean brightness) in a case where image signals obtained as aggregates of picture elements on the basis of picture element data constituting said image data from a video camera which is in a fixed position are subjected to a spatial Fourier transformation in a direction which is not perpendicular to a direction of movement of said plurality of moving bodies; and detecting said plurality of moving bodies on the basis of changes in said calculated spatial phases in said aggregates of picture elements.

2. A moving body detection method according to claim 1, wherein said aggregates of picture elements are respective blocks produced by dividing said image data into a plurality of lattice forms.

3. A moving body detection method according to claim 1, wherein said image signals are brightness signals.

4. A moving body detection method according to claim 2, wherein said image signals are brightness signals.

5. A moving body detection apparatus which detects a plurality of unmarked moving bodies by processing image data for said plurality of moving bodies said apparatus comprising:

determining a mean brightness from the image data;

a video camera outputting the image data for said plurality of moving bodies;

a spatial phase calculating means which calculates spatial phases by means of an operational formula $\tan^{-1}$ (AS/AC) or $\cot^{-1}$ (AC/AS) (where AC is a Fourier cosine transformation divided by the mean brightness and AS is a Fourier sine transformation divided by the mean brightness) in a case where image signals obtained as aggregates of picture elements on the basis of picture element data constituting said image data are subjected to a spatial Fourier transformation in a direction which is not perpendicular to a direction of movement of said plurality of moving bodies;

a spatial phase memory means which successively stores an output of said spatial phase calculating means at prescribed time intervals;

a spatial phase comparing means which compares said output of said spatial phase calculating means with an output of said spatial phase memory means storing a prior output of said spatial phase calculating means; and a movement judging means which judges a presence or an absence of moving bodies in said non-perpendicular direction in accordance with an output of said spatial phase comparing means.

6. A moving body counting apparatus which counts a plurality of unmarked moving bodies by processing image data for said plurality of moving bodies, said apparatus comprising;

a video camera for outputting image data for said plurality of moving bodies;

a means for determining a mean brightess from the image data;

a spatial phase calculating means which calculates spatial phases by means of an operational formula $\tan^{-1}$ (AS/AC) or $\cot^{-1}$ (AC/AS) (where AC is a Fourier cosine transformation divided by the mean brightness and AS is a Fourier sine transformation divided by the mean brightness) in a case where image signals obtained as aggregates of picture elements on the basis of picture element data constituting said image data are subjected to a spatial Fourier transformation in a direction which is not perpendicular to a direction of movement of said plurality of moving bodies;

a spatial phase memory means which successively stores an output of said spatial phase calculating means at prescribed time intervals;

a spatial phase comparing means which compares said output of said spatial phase calculating means with an output of said spatial phase memory means storing a prior output of said spatial phase calculating means;

a movement judging means which judges a presence or an absence of moving bodies in said non-perpendicular direction in accordance with an output of said spatial phase comparing means;

a position determining means which determines picture element aggregates corresponding to positions of said plurality of moving bodies in background data for a background including said plurality of moving bodies on the basis of the picture element aggregates judged to be moving bodies by said movement judging means; and a counting means which performs a counting operation when reference picture elements indicating a standard position of measurement set in said background data coincide with sad determined picture element aggregates.

* * * * *